United States Patent
Haraguchi (10) Patent No.: US 9,367,771 B2
(45) Date of Patent: Jun. 14, 2016

(54) APPARATUS HANDLING CODES, METHOD FOR CONTROLLING THE SAME, AND PROGRAM

(75) Inventor: Takahiro Haraguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1108 days.

(21) Appl. No.: 12/630,608

(22) Filed: Dec. 3, 2009

(65) Prior Publication Data

US 2010/0142000 A1   Jun. 10, 2010

(30) Foreign Application Priority Data

Dec. 4, 2008   (JP) .................. 2008-309964

(51) Int. Cl.
  *H04N 1/32* (2006.01)
  *G06K 15/02* (2006.01)
  *H04N 1/00* (2006.01)

(52) U.S. Cl.
  CPC .............. *G06K 15/02* (2013.01); *H04N 1/0087* (2013.01); *H04N 1/32144* (2013.01); *H04N 2201/3202* (2013.01); *H04N 2201/3205* (2013.01); *H04N 2201/3208* (2013.01); *H04N 2201/3233* (2013.01); *H04N 2201/3242* (2013.01); *H04N 2201/3246* (2013.01)

(58) Field of Classification Search
  None
  See application file for complete search history.

(56) References Cited

U.S. PATENT DOCUMENTS

| 7,793,204 B2 * | 9/2010 | Carlson | G06F 21/10 715/200 |
| 2005/0190948 A1 * | 9/2005 | Isogai | G06T 1/0028 382/100 |
| 2008/0085052 A1 * | 4/2008 | Sasamori | G06T 1/0021 382/190 |
| 2008/0231907 A1 * | 9/2008 | Ishii | 358/3.28 |

FOREIGN PATENT DOCUMENTS

| JP | 2007-158613 A | 6/2007 |
| JP | 2008-131522 A | 6/2008 |
| JP | 2008-172481 A | 7/2008 |

OTHER PUBLICATIONS

Machine translation for JP 2008-131522.*

* cited by examiner

*Primary Examiner* — Nicholas Pachol
*Assistant Examiner* — Lennin Rodriguezgonzale
(74) *Attorney, Agent, or Firm* — Canon USA Inc. IP Division

(57) ABSTRACT

An apparatus includes an acquisition unit configured to acquire a plurality of pieces of information from a medium, a deletion unit configured to delete a second oldest piece of information, which is next to an oldest piece of information, from the plurality of pieces of information acquired by the acquisition unit, an addition unit configured to add new information to the plurality of pieces of information from which the second oldest piece of information has been deleted by the deletion unit, and a printing unit configured to print on a new medium the plurality of pieces of information resulting from the addition by the addition unit.

23 Claims, 7 Drawing Sheets

APPARATUS HANDLING CODES, METHOD FOR CONTROLLING THE SAME, AND PROGRAM

BACKGROUND OF THE INVENTION

1. Field of the Invention

The present invention relates to an apparatus for handling codes, a method for controlling the apparatus, and a program.

2. Description of the Related Art

When electronic data is printed on a paper medium, it is difficult to ensure security for the paper medium. The level of security for such a paper medium may currently be low.

To overcome the above issue, techniques for providing tracking information to specify where information may have leaked have been proposed as a measure for increasing the level of security for a paper medium on which a copy has been made. One of the techniques is to record history information onto a medium, such as paper, by adding a code (e.g., a two-dimensional code or digital watermark) to the paper medium to track information and find where information may have leaked. However, there is a limit to the amount of information that may be contained in such a code. This requires that only the most necessary information be selected for the code. As discussed in Japanese Patent Application Laid-Open No. 2008-131522, the most necessary pieces of information are selected to be included in a code. Specifically, two pieces of information are selected: the most recent information and the second most recent information. Additionally, the oldest information is deleted.

Japanese Patent Application Laid-Open No. 2008-131522 discusses a technique of adopting digital watermarking, thereby recording, on a paper medium, data about a person who owns a paper medium and data about a person who makes a copy of the paper medium.

In this technique, when a paper medium is copied to make a first copy thereof, data about a person who owns the paper medium is updated to data about a person who makes the first copy, and data about a person who makes a second copy is updated to a person who makes the second copy.

Figure 4:
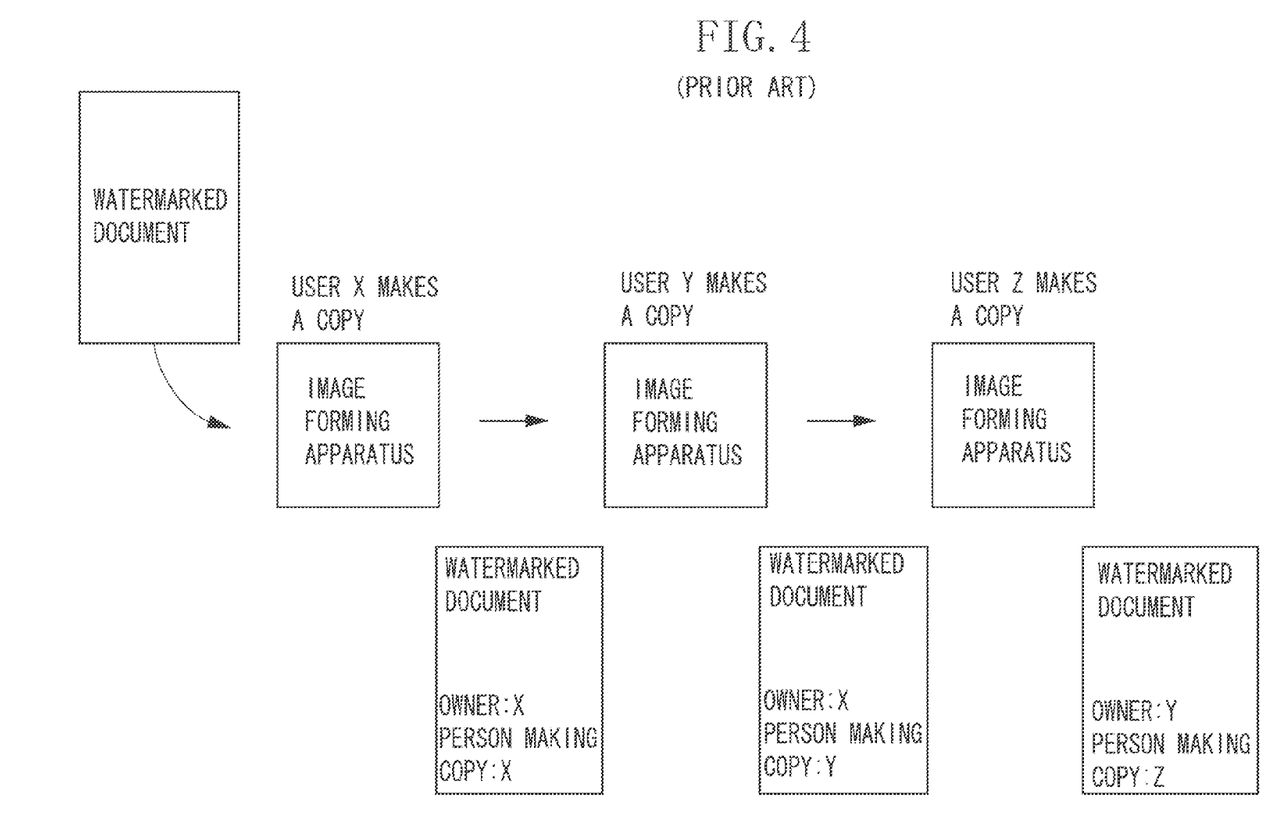
FIG. 4 is a diagram illustrating a technique discussed in Japanese Patent Application Laid-Open No. 2008-131522.

Referring to FIG. 4, the technique discussed in Japanese Patent Application Laid-Open No. 2008-131522 will now be described. When a user X makes a copy of a digitally watermarked document, the user X's name is recorded on the digitally watermarked document as owner data and as person-making-copy data. Next, if a user Y makes a copy of the digitally watermarked document as copied, the person-making-copy data of this document is updated to Y.

If a user Z makes a copy of the digitally watermarked document as copied twice, the owner data and the person-making-copy data of such a document are updated to Y and Z, respectively.

However, although the histories of the owner data and person-making-copy data recorded on a paper medium are updated each time a copy is made from a past copy on a paper medium, the trail leading to the user who produced the first print or copy from the document may be broken if one paper medium (with a copy on it) between the first one and the last one is lost. It may be difficult to, for example, specify a user who instructed an image forming apparatus to produce a print from electronic data (i.e., a user who made a copy on a paper medium).

This may make it difficult for a user who produced a print or copy to become aware of an information leak.

SUMMARY OF THE INVENTION

According to an aspect of the present invention, an apparatus includes an acquisition unit configured to acquire a plurality of pieces of information from a medium, a deletion unit configured to delete a second oldest piece of information, which is next to an oldest piece of information, from the plurality of pieces of information acquired by the acquisition unit, an addition unit configured to add new information to the plurality of pieces of information from which the second oldest piece of information has been deleted by the deletion unit, and a printing unit configured to print on a new medium the plurality of pieces of information resulting from the addition by the addition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

In an exemplary embodiment of the present invention, a description is given using an example of a code image of specific size (i.e., area) that can contain information of specific size (i.e., quantity). Needless to say, a code image of such specific size can also contain information of a size smaller than the specific size. In the present exemplary embodiments, it is assumed that a code image of such specific size can contain two kinds of user history data, one of which is called "first data" and the other "second data." In the present exemplary embodiment and other examples, information means data.

When a user logs into an image forming apparatus, the image forming apparatus accesses a data server to acquire information specifying the log-in user, and stores the information in a storage unit (hard disk drive (HDD), memory, or the like), not illustrated, in the image forming apparatus. After the information has been stored, the logging-in process of the apparatus completes itself. A data server, not illustrated, is a log-in management server electrically connected to the image forming apparatus. In the present exemplary embodiment and other examples, information specifying a user will hereinafter be referred to as user information. For example, user information contains a user ID, user name, and the like. Information specifying a user indirectly is also included in information specifying a user. For example, the time at which a copy is made and the number assigned to an image forming apparatus used for making the copy is also information that specifies a user indirectly, as the time at which a copy is made may be useful for tracking information about who has instructed an image forming apparatus to copy a document (for example, a surveillance camera may show a user standing in front of the image forming apparatus (i.e., a copying machine)). In addition, a number assigned to an image forming apparatus may also be useful as tracking information for determining who has instructed the image forming apparatus to copy a document (for example, a particular user may often use this image forming apparatus). "Information specifying a user indirectly" means "information useful for specifying a user."

Figure 1:
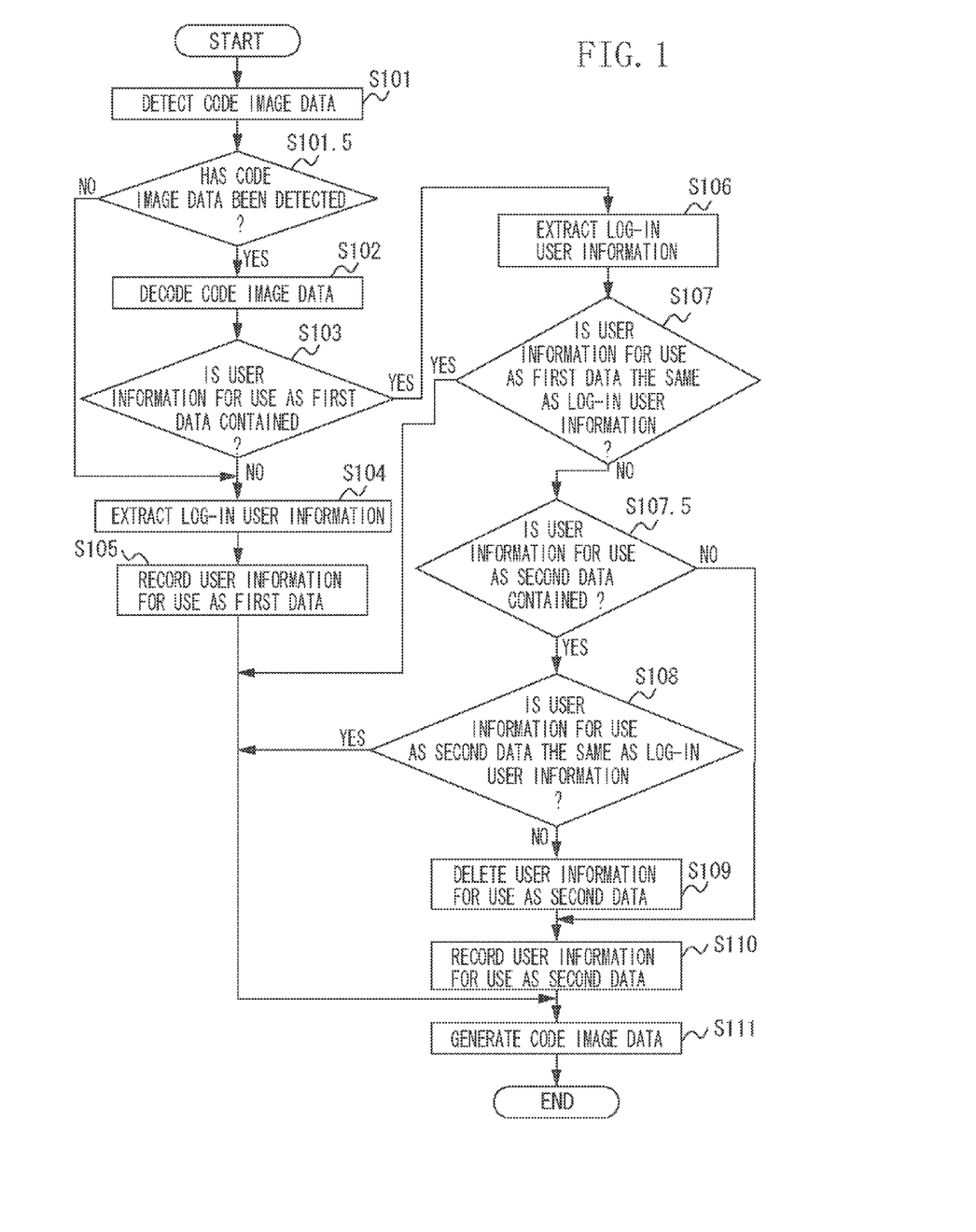
FIG. 1 is a flowchart illustrating processing performed by an apparatus according to a first exemplary embodiment of the present invention.
Figure 7:
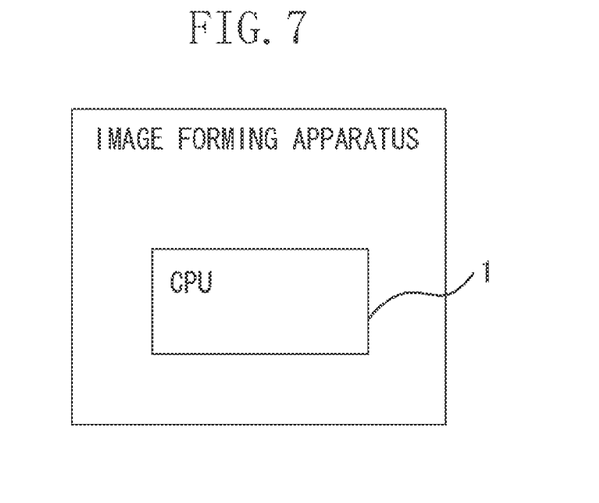
FIG. 7 illustrates an image forming apparatus performing each processing illustrated in the flowchart of FIG. 1 or FIG. 5.

FIG. 1 is a flowchart illustrating processing performed after a central processing unit (CPU) 1 in the image forming apparatus illustrated in FIG. 7 instructs a scanner in the image forming apparatus to read a document to be copied and the document image data is consequently generated. The CPU 1 controls the image forming apparatus illustrated in FIG. 1 by reading program code in ROM (not shown) of the image forming apparatus. Before the document to be copied is read by the scanner of the image forming apparatus, an instruction to copy the document placed on the scanner will have been given to the image forming apparatus by the log-in user. A user who has instructed to make a copy after logging into an image forming apparatus in such a manner will hereinafter be called "a copy user."

In step S101, the CPU 1 performs a process for detecting code image data in the document image data.

In step S101.5, the CPU 1 determines whether the document image data contains code image data. If code image data has been detected in step S101.5, the processing proceeds to step S102. If no code image data has been detected in step S101.5, the processing proceeds to step S104.

In step S102, the CPU 1 decodes the code image data detected in step S101.5. Consequently, any information (i.e., user history data) contained in the code image data is acquired. The user history data thus acquired is stored in a storage unit.

In step S103, the CPU 1 determines whether the user history data contains user information for use as first data. If the user information as first data is contained in step S103, the processing proceeds to step S106. If no useful information is contained in step S103, the processing proceeds to step S104.

Code image data handled in the present exemplary embodiment and other examples contain pieces of user information in ascending order. In the present exemplary embodiment, in addition to user information for use as first data, user information for use as second data is included. Accordingly, if no user information corresponding to first data is included, user information corresponding to second data is not included either.

In step S104, the CPU 1 extracts the user information from the storage unit.

In step S105, the CPU 1 records the user information, extracted from the storage unit, as first data in the user history data. Specifically, if the process of step S102 is performed and then the condition in step S103 is satisfied, the first data in the user history data stored in the storage unit is updated and this updated history data is stored in the storage unit again. If the process in step S102 is performed but the condition in step S103 is not satisfied, the extracted user information is stored in the storage unit as first data in the user history data. Further, in step S111, the CPU 1 encodes the user history data and generates image code data of the specific size. Processing is then terminated. In this case, the user history data includes no second data.

In step S106, the CPU 1 performs a process for the case where the user history data includes user information for use as first data. Specifically, in step S106, the CPU 1 extracts the user information from the storage unit.

In step S107, the CPU 1 determines whether the user information contained in the user history data as first data is identical to the user information extracted from the storage unit. If a determination is made in step S107 that these are identical, the processing proceeds to step S111, in which the user history data that has been stored in the storage unit (without being changed) is encoded, and code image data of the specific size is generated. The processing is terminated.

Thus, when at least part (i.e., the first data) of the information contained in the code image data is identical to the new information (i.e., the information about the log-in user who instructs to copy the document) to be contained in the code image data, the user history data is not changed.

If the user information for use as first data and the log-in user information are found not to be identical in step S107, the processing proceeds to step S107.5.

In step S107.5, the CPU 1 determines whether the user history data stored in the storage unit contains user information for use as second data. If the user history data includes user information as second data in step S107.5, the processing proceeds to step S108. If the user history data includes no user information as second data in step S107.5, the processing proceeds to step S110.

In step S108, the CPU 1 determines whether the user information included as second data in the user history data is identical to the user information extracted from the storage unit. If the determination is made in step S108 that these are identical, the processing proceeds to step S111, in which the user history data that has been stored in the storage unit (without being changed) is encoded and a code image data of the specific size is generated. The CPU 1 then terminates processing.

Thus, when at least part of the information (i.e., second data) included in the code image data is identical to the new information (i.e., information about a log-in user who instructs to copy the document) to be included in the code image data, the user history data is not changed.

If the determination is made in step S108 that the user information included as second data in the user history data is not identical to this new information, the processing proceeds to step S109.

In step S109, the CPU 1 deletes from the user history data the user information contained as second data in the user history data stored in the storage unit.

In step S110, the CPU 1 records, for use as second data in the user history data, the user information extracted from the storage unit. More specifically, the CPU 1 modifies the user history data so that this user information is included as second data in the user history data, and the user history data thus modified is stored in the storage unit. As a result of the processes in steps S109 and S110, first data in the user history data is not updated but only second data therein is updated. In other words, in step S110, the user information is recorded as new second data in the user history data from which the previous second data has been deleted in step S109. In step S111, the CPU 1 encodes the user history data stored in the storage unit in step S110 and generates code image data of the specific size. Processing is then terminated.

In steps S103 to S110, while first data in the user history data is left as is, second data in the user history data is updated. Specifically, the previous second data is deleted, and the new user information (i.e., the most recent information) is recorded as second data. Thus, from among the three pieces of information, namely the first data, second data, and most recent information, the first data and most recent information are selected as user history data. As is apparent from the rule (that the code image data includes pieces of user information in ascending order), first data means the oldest information. That is, in steps S103 to S110, the oldest and the most recent information are selected for use as the user history data. In other words, from among the three pieces of information (which are the first and second data, and most recent information), the oldest information as second data (i.e., the next oldest information) but not the oldest information as first data is deleted, and other information (which is not selected as second data) is selected as the user history data.

Thereafter, the CPU 1 combines the generated code image data with the document image data acquired by scanning the document to be copied. The area where they are combined on a copy of the document is the same as that where a code image has been located on the document to be copied. A printing unit (not illustrated) in the image forming apparatus prints the image data acquired by combining these. Consequently, the user history data converted into a code containing the oldest information and the most recent information is added to (i.e., contained into) the copy of the document.

In the above example, it is assumed that the encoded user history data is printed on a copy of the document as code image data when the document is copied.

However, such a situation in which code image data (i.e., encoded user history data) is printed on a paper medium may also occur when printing is carried out by transmitting print data from a personal computer to an image forming apparatus.

In this case, a printer driver adds user information (i.e., information about the user of a host computer) to the print data, and the CPU 1 in the image forming apparatus that receives the print data to which the user information has been added generates code image data from this user information as first data in the user history data. Then, the CPU 1 causes a printing unit (not illustrated) in the image forming apparatus to print the image data obtained by combining the print data and the code image data thus generated. In this case, there is a single piece of user information available and, therefore, the user history data includes no second data. In addition, encoded user information contained in the code image data is information about the first user making a copy of a document on a paper medium, or the first user instructing an image forming machine to print from electronic data. The first user making a copy of a document on a paper medium in the manner described above may hereinafter be called "a print user." Other users, that is, users copying may thereafter be called "copy users."

Print data may hereinafter be called "document data." The present exemplary embodiment has been described using a paper medium as an example. However, the code image data does not have to be printed on a paper medium. It may be printed on another medium, for example, an over head projector (OHP) sheet. In the exemplary embodiments and other examples, a medium such as a paper medium or OHP sheet, on which image data is printed, will simply be called "a medium", although this term is different from a storage medium, such as a memory, HDD, compact disc (CD) or digital versatile disc (DVD), which can store information digitally.

When a document to be printed or copied that contains print user information as first data and copy user information as second data is scanned and the processing illustrated in FIG. 1 is carried out, the following steps are taken: copy user information as second data and print user information as first data are encoded in step S111 such that the former is updated in steps S109 and S110 whereas the latter is not.

Figure 2:
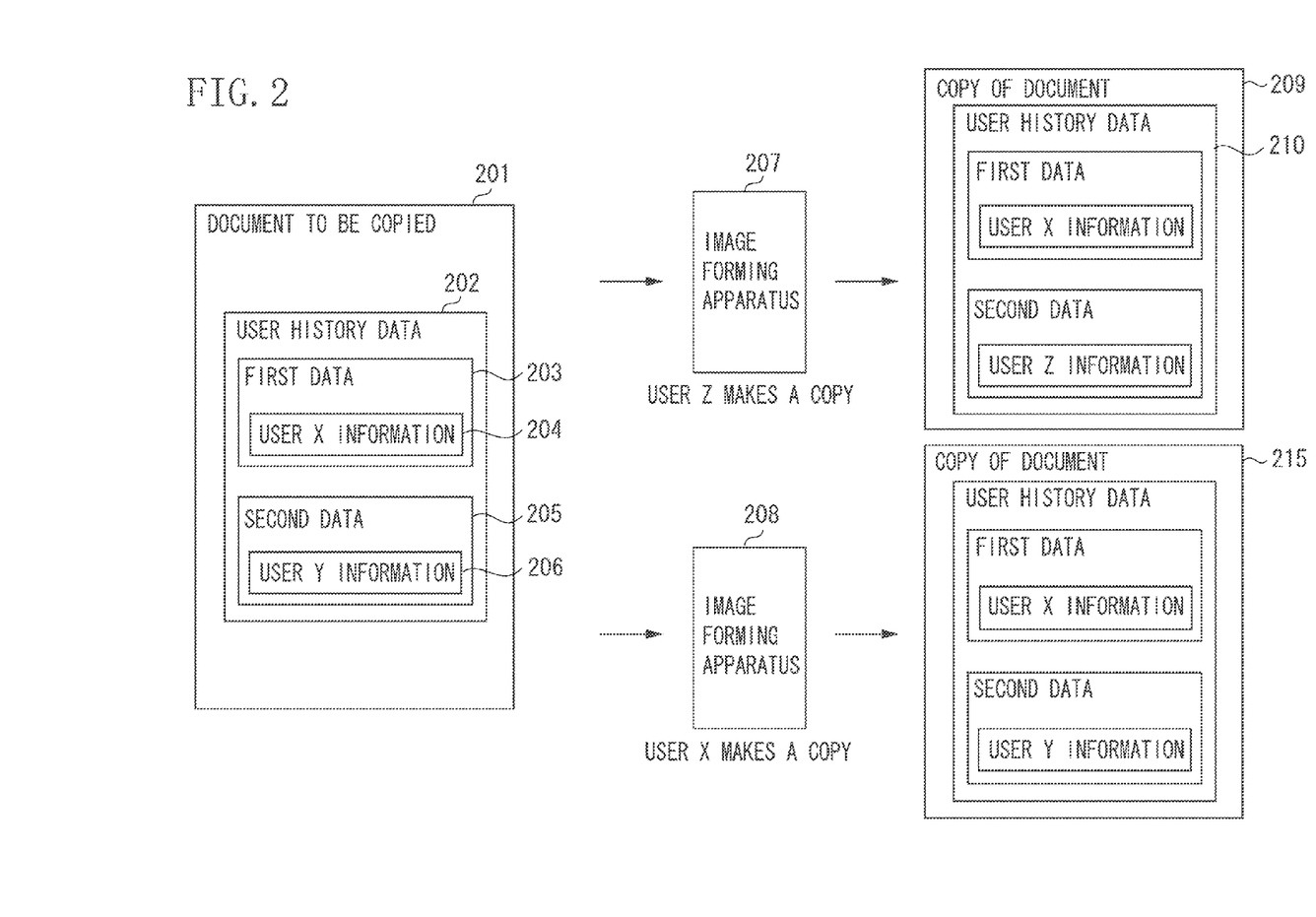
FIG. 2 is a diagram illustrating a change in user history data added to a copy according to the flowchart illustrated in FIG. 1.

FIG. 2 is a diagram illustrating a change in encoded user history data added to a copy according to the flowchart illustrated in FIG. 1.

A document 201 to be copied contains encoded user history data that has been printed thereon. User X information 204 and user Y information 206 have been recorded as first and second data 203 and 205, respectively, in the encoded user history data 202.

In this case, if a user Z copies the document 201 by use of the image forming apparatus 207, procedure from steps S106 to S111 updates the second data. As a result, as illustrated in a copy 209 of the document, the information between the oldest information and the most recent information (i.e., previous second data) in user history data 210 is deleted and, instead, the most recent information is contained as second data in the user history data.

Thus, in the present exemplary embodiment, the most recent and the oldest information, encoded with information between them deleted, are included in a copy of the document as user history data. However, there may be an exception in which the most recent information is identical to the oldest information. In such an exceptional case, the present exemplary embodiment does not delete information between the oldest information and the most recent information, but leaves them.

The lower part of FIG. 2 illustrates such an exceptional case (i.e., a user X makes a copy of the document 201 by use of an image forming apparatus 208). In this case, the result of the determination in step S107 is "YES" (i.e., user X information as first data is identical to user X information specifying a log-in user). Accordingly, as illustrated in a copy 215 of the document, the information (i.e., user Y information) between the most recent information and the oldest information is not deleted.

Thus, in the present exemplary embodiment, information between the oldest information and the most recent information is not deleted deliberately, thereby enabling a code image of the specific size to include the maximum quantity of information.

Figure 3:
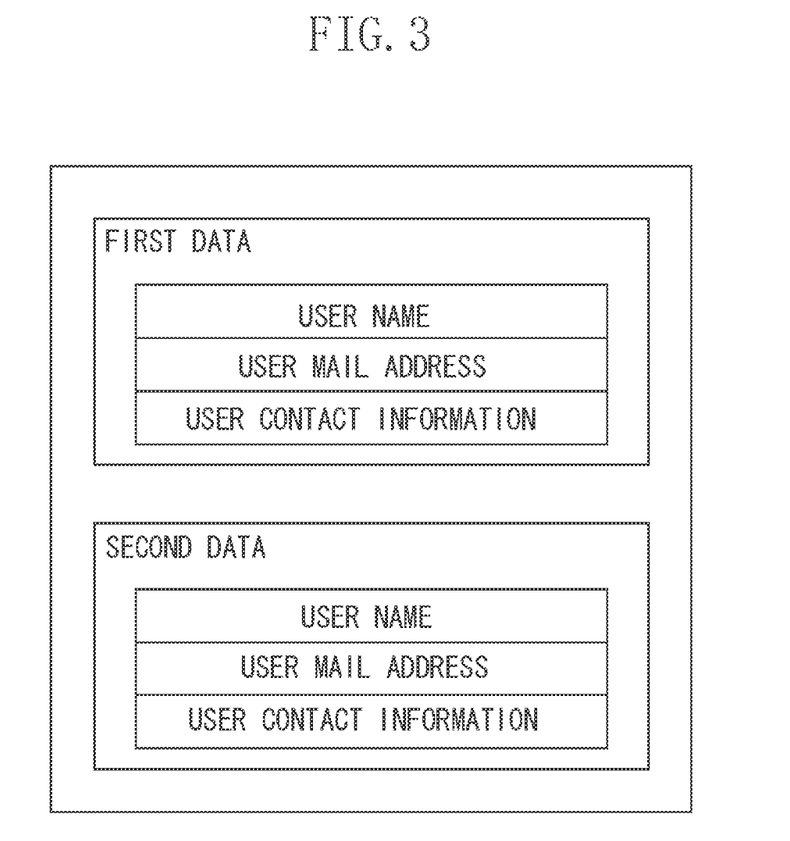
FIG. 3 illustrates an example of a structure of user history data.

FIG. 3 illustrates an example of a structure of user history data.

The user history data includes two kinds of information, first data and second data. User information includes a user name, a user mail address, and a user contact information, and is recorded, as first data and second data, in each set of user history data.

The present invention is not limited to the forgoing three pieces of information (user name, user mail address, and user contact information) but may change user information in the user history data as circumstances demand. Other examples of user information may include information about an apparatus used by a user, information about a date on which a user made a copy, information about the number of times the document is copied, etc.

The above exemplary embodiment has been described assuming that two kinds of information are included in the code image data. In the present exemplary embodiment, from among the three pieces of information (which are first and second data, and most recent information), first data (i.e., the oldest information) and most recent information are selected and used as the user history data. In other words, from among these three pieces of information, the oldest information as second data (i.e., the next oldest information) but not the oldest information as first data is deleted, and the two pieces of information remaining as a result of excluding the second data are selected as the user history data.

This principle applies to the case where an N (N is an integer of 3 or greater) number of pieces of information can be contained in the code image data. Specifically, when N is 3 or greater, the oldest information as second data (i.e., the next oldest information) but not the oldest information as first data is removed from among a number of pieces of information, and (N−1) pieces of information are selected as user history data.

As a result, the most recent information and the oldest information remain. From among information excluding the most recent and oldest information, the more recent information remains. In the following exemplary embodiment, a description is given of the case where N is 3. Needless to say, the above principle also applies to the case where N is 4 or greater.

In a second exemplary embodiment of the present invention, it is assumed that a code image of specific size can contain three kinds of user history data, which will hereinafter be called "first data," "second data," and "third data."

When a user logs into an image forming apparatus, the image forming apparatus accesses a data server to acquire information (i.e., user information) specifying a log-in user, and stores the information in a storage unit (not illustrated) (e.g., HDD or a memory) in the image forming apparatus. A data server means (not illustrated) is a log-in management server electrically connected to the image forming apparatus.

Figure 5:
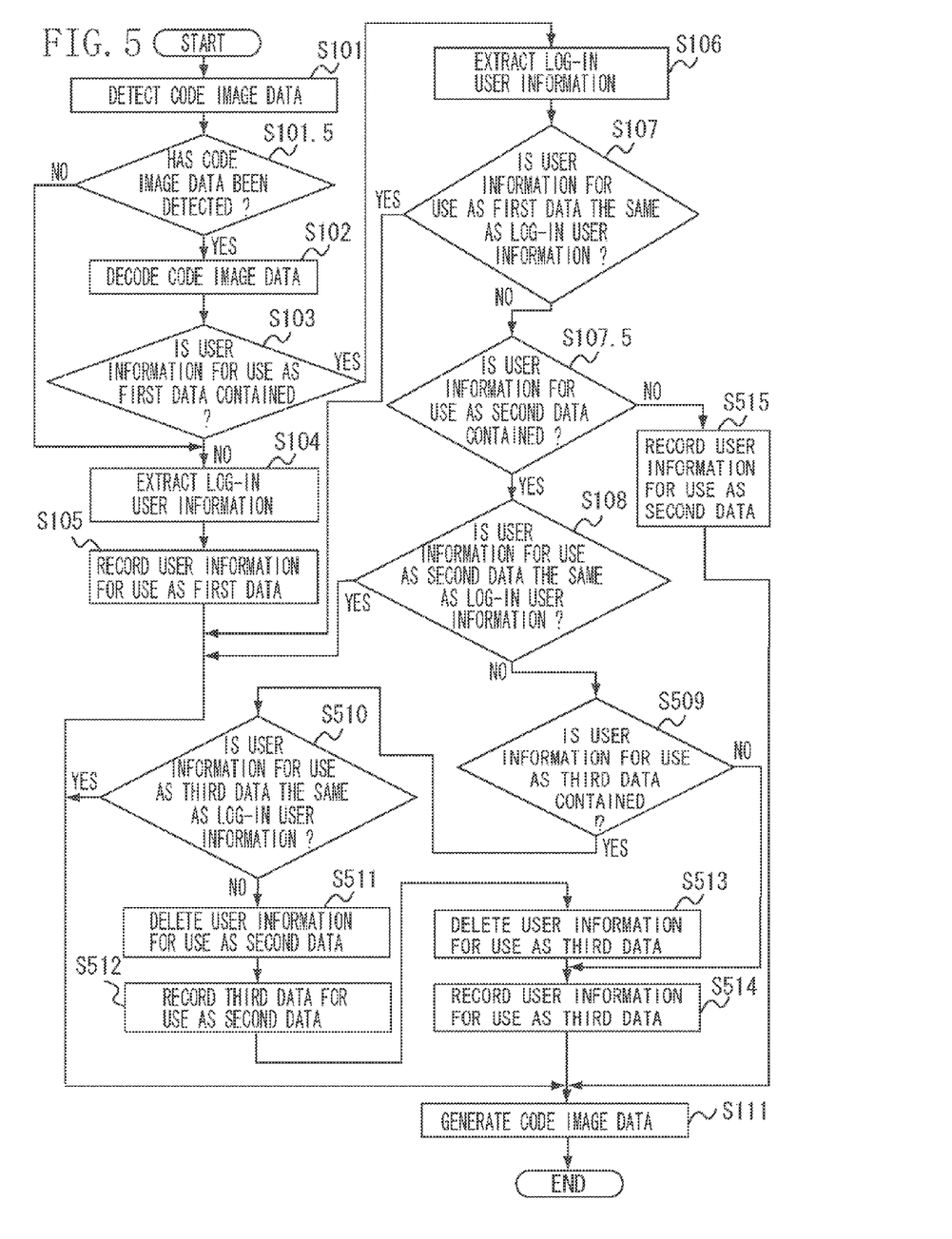
FIG. 5 is a flowchart illustrating processing performed by an apparatus according to a second exemplary embodiment of the present invention.

FIG. 5 is a processing flowchart in which a code image of the specific size can contain the three kinds of user history data. According to this flowchart, a CPU 1 (not illustrated) in the image forming apparatus, which controls the image forming apparatus, generates document image data by instructing the scanner of the image forming apparatus to read a document to be copied.

A description of the second exemplary embodiment with reference to FIG. 5 will be given focusing only on those processes (steps S509 to S515), which differ from those illustrated in FIG. 1.

In step S509, the CPU 1 determines whether user history data stored in the storage unit includes user information as third data. If the determination is made in step S509 that the user history data includes user information as third data, the processing proceeds to step S510. If the determination is made in step S509 that the user history data includes no user information as third data, the processing proceeds to stop S514.

In step S510, the CPU 1 determines whether the user information included as third data in the user history data is identical to user information extracted from the storage unit. If the determination is made in step S510 that these are identical, the processing proceeds to step S111, in which the user history data stored in the storage unit is encoded unchanged, and code image data of the specific size is generated. Processing is then terminated.

If the determination is made in step S510 that the user information contained as third data in the user history data is not identical to the user information extracted from the storage unit, the processing proceeds to step S511.

In step S511, the CPU 1 deletes the user information as second data from the user history data.

In step S512, the CPU 1 instructs that the user information contained as third data in the user history data be recorded as second data in the user history data.

In step S513, the CPU 1 deletes from the user history data the user information contained as third data.

In step S514, the CPU 1 records as third data in the user history data the user information extracted from the storage unit. That is, the user history data is modified such that the previous third data is included as second data in the user history data. The user history data thus modified is stored in the storage unit. As a result of the procedure from steps S511 to S514, the second data and third data are updated without upgrading the first data in the user history data. Furthermore, in step S111, the CPU 1 encodes the user history data stored in the storage unit in step S514, and generates code image data of the specific size. The CPU 1 then terminates processing.

In step S515, the CPU 1 records, as second data in the user history data, the user information extracted from the storage unit. Furthermore, in step S111, the CPU 1 encodes the user history data and generates image data of the specific size. Processing is then terminated. In other words, the user history data includes no third data.

In steps S103 to S514, while the first data and previous third data in the user history data remain, the third data in the user history is updated. Specifically, the previous second data is deleted; instead, the previous third data is recorded as second data, and then the new user information (i.e., the most recent information) is recorded as third data. Thus, from among the four pieces of information (which are first data, second data, third data, and the most recent data), the first data, third data, and the most recent data are selected as the user history data. As is apparent from the rule (that user information is included in the ascending order) described above, first data is the oldest data. Accordingly, in steps S103 to S514, the oldest and most or more recent pieces of information only are selected as the user history data.

The second exemplary embodiment has been described using a case where the user history data contains three kinds of user information. However, needless to say, even when four or more kinds of user information are included in the user history data, the user history data can be generated based on the same principle that previous second data is deleted.

Figure 6:
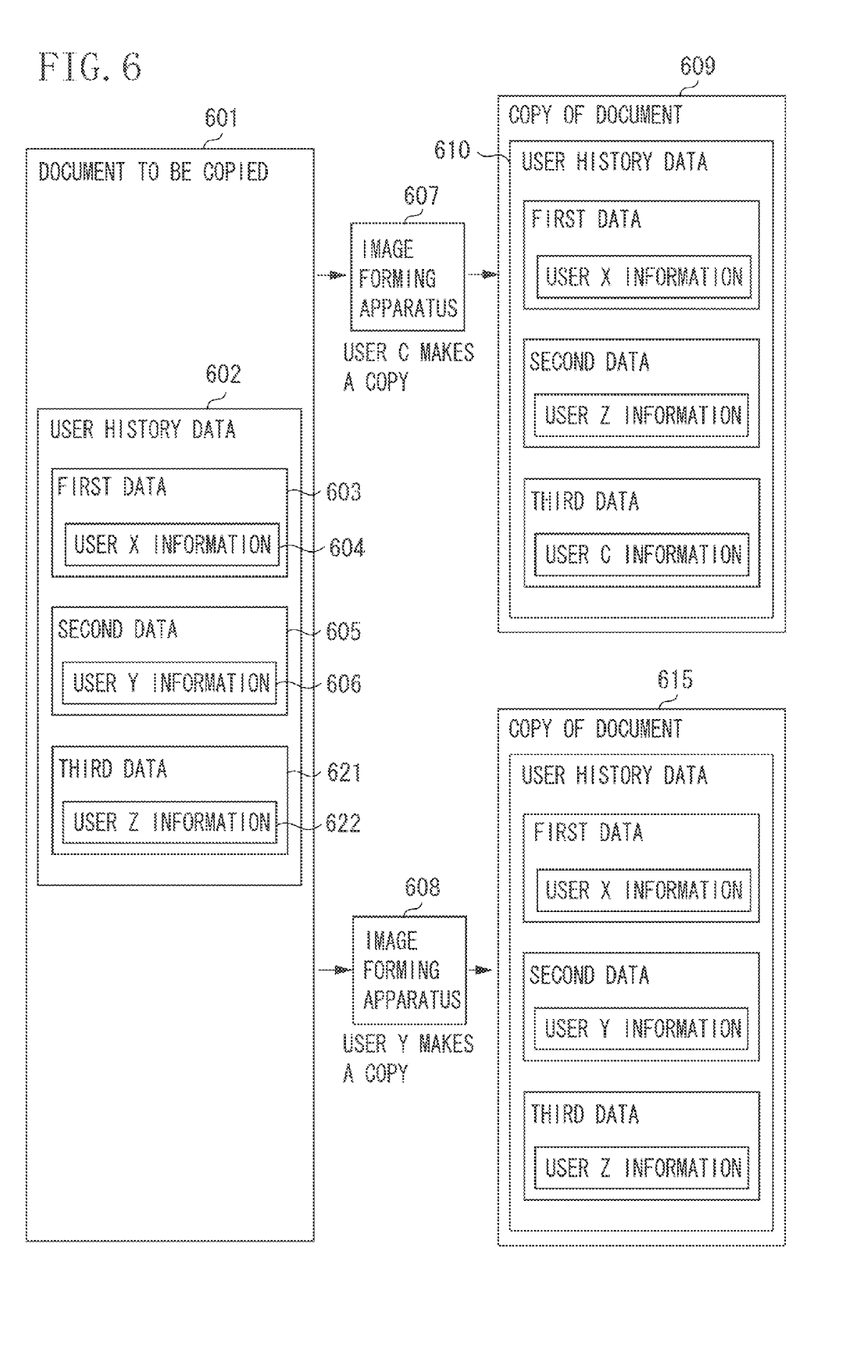
FIG. 6 is a diagram illustrating a change in user history data added to a copy according to the flowchart illustrated in FIG. 5.

FIG. 6 illustrates a change in encoded user history data added to a copy according to the processing flowchart illustrated in FIG. 5.

Encoded user history data 602 is printed on a document 601 to be copied. User X information 604, user Y information 606, and user Z information 622 are recorded as first data 603, second data 605, and third data 621, respectively, in the encoded user history data 602.

When a user C makes a copy of the document 601 by use of an image forming apparatus 607, steps 509 to 514 and step S111 proceed in this order, second data is updated to the previous third data, and third data is updated to the new data. Consequently, as illustrated in a copy 609 of the document, one piece of information (i.e., the previous second data) between the oldest information and the most recent information is deleted from the user history data 610, the second data is updated to the previous third data, and the most recent information is contained as third data in the user history information.

The lower part of FIG. 6 illustrates a case where a user (a user Y, in FIG. 6) whose information has been recorded as the user history data for the document 601 to be copied, makes a copy using an image forming apparatus 608. In this case, the result of the determination in step S108 is YES (i.e., the user Y information as second data is identical to user Y information as information specifying the log-in user). As illustrated in a copy 615 of the document, information (i.e., user Z information) between the oldest information and the most recent information is not deleted.

The first and second exemplary embodiments have been described assuming that the processes of steps in the corresponding flowcharts are performed using the respective single apparatuses but each of the processes of steps in the corresponding flowcharts may be performed using different apparatuses.

Figure 8:
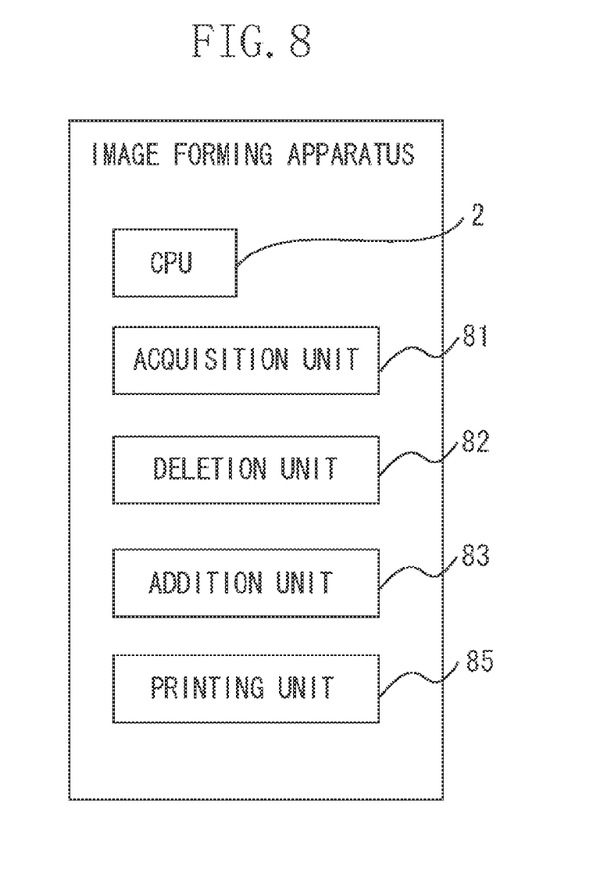
FIG. 8 illustrates another image forming apparatus performing each processing illustrated in the flowchart of FIG. 1 or FIG. 5.

In addition, the first and second exemplary embodiments have been described as being implemented by the image forming apparatus illustrated in FIG. 7. Thus, all of the processes illustrated in the flowchart of FIG. 1 are performed by the CPU 1 reading program code. However, the present invention is not limited to this configuration. Some processes can be performed by hardware, for example, by an image forming apparatus illustrated in FIG. 8. The image forming apparatus illustrated in FIG. 8 includes a CPU 2, an acquisition unit 81, a deletion unit 82, an addition unit 83, and a printing unit 85. The acquisition unit 81 performs the process in step S106. The deletion unit 82 performs the process in step S109. The addition unit 83 performs the process in step S110. The CPU 2 performs all of the other processes in the flowchart of FIG. 1. Then, the printing unit 85 prints the code image data generated in step S111.

In addition, the present invention can also be embodied by a computer that can read and execute program code (stored in a storage medium) provided to implement the procedure of the flowchart described in the exemplary embodiments and the other examples described above.

In this case, the program code read from the storage medium implements the function of the exemplary embodiments described above. Accordingly, the program code and a storage medium storing the program code can also constitute the present invention. The program code can be read from a storage medium. The storage medium for supplying the program code may be, for example, a floppy disk, hard disk, optical disc, magneto-optical disc, compact disc-read only memory (CD-ROM), compact disc recordable (CD-R), magnetic tape, nonvolatile memory card, or read-only memory (ROM).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-309964 filed Dec. 4, 2008, which is hereby incorporated by reference herein in its entirety.

What is claimed is:

1. An apparatus comprising:
   a reading unit configured to read a document in a case where a user instructs to copy the document, the document including, as a code image, first user information and second user information different from the first user information respectively identifying a first user and a second user having instructed to make a copy after the first user;
   a decoding unit configured to decode the code image in a document image of the read document to obtain the first and second user information;
   a selecting unit configured to select the first user information from among the first and second user information;
   a generating unit configured to generate a different code image not including the second user information identifying the second user having instructed to make a copy after the first user, but including the selected first user information and user information identifying the user who instructs to copy the document by encoding the first user information and the user information identifying the user who instructs to copy the document; and
   a printing unit configured to print the generated code image.

2. The apparatus according to claim 1, wherein the first user and the second user are not the same user.

3. The apparatus according to claim 1, further comprising a combining unit configured to combine the generated code image and the document image, wherein the printing unit prints an image obtained by the combining.

4. The apparatus according to claim 3,
   wherein the combining unit combines the generated code image on an area in the document image based on a position of the code image included in the document image.

5. The apparatus according to claim 4,
   wherein the code image including the first user information and the second user information is deleted before the printing unit prints the image obtained by the combining.

6. The apparatus according to claim 1, wherein
   the first user, the second user and the user instructing to copy the document are not the same user.

7. The apparatus according to claim 1,
   wherein the generated code image and the code image included in the document image are two-dimensional codes which include information under a predetermined size, the predetermined size of the generated code image being the same as the predetermined size of the code image included in the document image.

8. The apparatus according to claim 1, wherein the user who instructs to copy the document is a login user at a time when copying the document is instructed.

9. The apparatus according to claim 1, wherein the document was obtained in response to an instruction by the second user making a copy of a document having been obtained in response to an instruction by the first user making a copy of a document.

10. A method comprising:
    reading a document in a case where a user instructs to copy the document, the document including, as a code image, first user information and second user information respectively identifying a first user and a second user who is different from the first user;
    decoding the code image in a document image of the read document to obtain the first and second user information;
    selecting the first user information from among the first and second user information;
    generating a different code image not including the second user information identifying a second user who has instructed to make a copy after the first user, but including the selected first user information identifying a first user who has instructed to make a copy before the second user and user information identifying the user who instructs to copy the document by encoding the first user information and the user information identifying the user who instructs to copy the document; and
    printing the generated code image.

11. The method according to claim 10, wherein the first user and the second user are not the same user.

12. The method according to claim 10, further comprising combining the generated code image and the document image, wherein the printing includes printing an image obtained by the combining.

13. The method according to claim 12, wherein the combining step combines the generated code image on an area in the document image based on a position of the code image included in the document image.

14. The method according to claim 12, wherein the code image including the first user information and the second user information is deleted before the image obtained by the combining is printed.

15. The method according to claim 10, wherein the first user, the second user and the user instructing to copy the document are not the same user.

16. The method according to claim 10, wherein the generated code image and the code image included in the document image are two-dimensional codes which include information under a predetermined size, the predetermined size of the generated code image being the same as the predetermined size of the code image included in the document image.

17. The method according to claim 10, wherein the user who instructs to copy the document is a login user at a time when copying the document is instructed.

18. The method according to claim 10, wherein the document was obtained in response to an instruction by the second user making a copy of a document having been obtained in response to an instruction by the first user making a copy of a document.

19. A method comprising:
reading a document in a case where a user instructs to copy the document;
selecting first user information from among first user information and second user information;
generating a code image including user information identifying the user;
combining a document image of the read document and the generated code image;
printing an image obtained by the combining; and
decoding a code image included in the document image to obtain the first user information and second user information,
wherein in a case where the first user information and the second user information respectively identifying a first user and a second user having instructed to make a copy after the first user are obtained by the decoding, and
wherein the generating step includes generating the code image not including the second user information identifying the second user having instructed to make a copy after the first user, but including the selected first user information and the user information identifying the user who instructs to copy the document by encoding the selected first user information and the user information identifying the user who instructs to copy the document.

20. A non-transitory computer-readable storage medium storing a control program, which when loaded into a computer and executed, performs the method according to claim 19.

21. An apparatus comprising:
a unit configured to read a document including a single code image first user information and second user information, the second user information specifying a different user who gave a copy instruction after a user specified by the first user information, in response to a copy instruction given to copy the document;
a unit configured to decode the single code image in a document image of the read document;
a unit configured to select the first user information from among the first and second user information;
a unit configured to encode the selected first user information and third user information specifying a user who gave the copy instruction to copy the document to generate a different single code image which does not include the second user information specifying the different user who gave a copy instruction after the user specified by the first user information, but includes the first user information and the third user information; and
a unit configured to print the generated single code image at a position based on a position of the single code image included in the document image.

22. A method for controlling an apparatus, the method comprising:
reading a document including as a single code image first user information and second user information, the second user information specifying a different user who gave a copy instruction after a user specified by the first user information, in response to a copy instruction given to copy the document;
decoding the single code image in a document image of the read document;
selecting the first user information from among the first and second user information;
encoding the selected first user information and third user information specifying a user who gave the copy instruction to copy the document to generate a different single code image which does not include the second user information specifying the different user who gave a copy instruction after the user specified by the first user information, but includes the first user information and the third user information; and
printing the generated single code image at a position based on a position of the single code image included in the document image.

23. An apparatus comprising:
a reading unit configured to read a document including at least oldest and second oldest pieces of user information as a code mage in a case where a user instructs to copy the document, the at least oldest and second oldest pieces of user information identifying at least oldest and second oldest users respectively, each of the at least oldest and second oldest users having instructed to make a copy;
a decoding unit configured to decode the code image in a document image of the read document;
a unit configured to select the oldest piece of user information from among the at least oldest and second oldest pieces of user information;
a generating unit configured to generate a different code image not including the second oldest piece of user information identifying a user having instructed most recently to make a copy among the at least oldest and second oldest users, but including the oldest piece of user information identifying a user having instructed least recently to make a copy among the at least oldest and second oldest users and a third piece of user information identifying the user who instructs to copy the document by encoding the oldest piece of user information and the third piece of user information; and
a printing unit configured to print the generated code image.

* * * * *